Patented Sept. 1, 1936

2,053,095

UNITED STATES PATENT OFFICE 2,053,095

MODIFICATIONS OF PHENYL-AZO-2,4-DI-AMINO-BENZENE-HYDROCHLORIDE AND THEIR PRODUCTION

Alexander T. Maximoff, Milan, Italy, assignor to Azodal Company, Inc.

No Drawing. Application December 19, 1932, Serial No. 647,964. Renewed January 28, 1936

3 Claims. (Cl. 260—96)

My invention relates to the methods of obtaining various modifications of phenyl-azo-2,4-diaminobenzene-hydrochloride.

The object of my invention is to provide modifications of phenyl-azo-diaminobenzene, which will be especially effective for treating infections, such as genito-urinary and skin infections.

While investigating various derivatives of phenyl-azo-diaminobenzene, I succeeded in obtaining phenyl-azo-2,4-diaminobenzene-hydrochloride in the form of three crystalline modifications, one of them black, one violet, and one red. I also succeeded in developing certain methods whereby it became possible to obtain at will any of these three modifications. I further discovered that these modifications, especially red and violet, can be obtained by my method in a pure form without ordinary injurious ingredients, and they are therefore non-toxic when administered to patients for treating various infectious diseases, being at the same time very beneficial due to their high bacteriostatic index.

In beginning the description of the methods of obtaining various modifications of phenyl-azo-diaminobenzene which I have worked out, I must first of all emphasize that the deciding factor in this connection is the pH of the medium in which the coupling of diazotized aniline with 2,4-diaminobenzene is performed. When there is an almost neutral reaction, or to be more exact, when there is an almost total absence of free hydrochloric acid in the reacting medium, there is obtained the violet modification always in pure crystalline form, which after being filtered off contains only the admixtures which were present in the mother liquor. When this product is washed, first with an insignificant quantity of distilled water, and then with relatively weak hydrochloric acid, e. g. 6.4%-acid, and dried to a constant weight, the violet modification of the substance is obtained in chemically pure state. When a mixture of chemically pure phenyl-azo-diaminobenzene and concentrated hydrochloric acid is evaporated on a water bath, the red modification of the hydrochloride is obtained in chemically pure state. If, however, the evaporation continues at 100° C. for a considerable time, this red modification of the hydrochloride may contain, and as a rule contains, the free base of phenyl-azo-diaminobenzene, although but in a quite negligible amount. These traces of the base appear as the result of splitting off in free state of hydrochloric acid, which during evaporation passes off into the air with steam. This insignificant admixture of the free base has no effect on the therapeutic use of this preparation indicated in this description.

If the free base of phenyl-azo-diaminobenzene, well washed with water and thoroughly pressed, obtained by means of precipitation by ammonia of the reacting mixture which is obtained in turn by the coupling of diazotized aniline with meta-phenylenediamine, is acted upon by 13.4%-hydrochloric acid, and the resulting mixture energetically ground, the following process occurs: The gradually forming hydrochloride dissolves in the acid, but then, with the accumulation of the already dissolved salt, is again precipitated in crystalline form. At the end of this process, the entire original product is transformed into crystalline state. The hydrochloride of phenyl-azo-diaminobenzene which is obtained in this way has the form of needle-like crystals, and is of an anthracite-black color and strong lustre. Only an insignificant part of it remains in solution. When this black modification is being dried, exceedingly high temperature or abnormally long heating should be carefully avoided. Otherwise it is transformed into the violet modification to a certain extent. Then there results a mixture of the two modifications of a gray color sometimes having a violet tint. This product resembles greatly the commercial phenyl-azo-diaminobenzene. It causes, as well as the black modification per se, necrosis when injected subcutaneously.

All the modifications described are easily transformed into each other. For the sake of brevity, we designate the red modification of the hydrochloride as "alpha-P. A. D. A. B.", the violet, as "beta-P. A. D. A. B.", and the black, as "gamma-P. A. D. A. B.".

In order to transform any modification of P. A. D. A. B. into the black gamma-modification, it is sufficient to precipitate from the given hydrochloride (i. e., from alpha- or beta-P. A. D. A. B., or even from their mixture) the free base by means, e. g., of ammonia, wash it with water in order to remove ammonium chloride, press it well, and without drying, subject the resulting product at normal temperature to the action of hydrochloric acid taken in sufficient excess. As a result, there are deposited lustrous crystalline needles of the anthracite-black modification of phenyl-azo-diaminobenzene-hydrochloride, i. e., gamma-P. A. D. A. B.

In order to transform beta- of gamma-hydrochloride, or their mixture, into the red alpha-P. A. D. A. B., it is sufficient to pour concentrated hydrochloric acid over the original substance, mix well the resulting mixture, and then evaporate it, e. g., on water bath to a constant weight. There results the crystalline red alpha-modification of P. A. D. A. B.

Note: In concentrated hydrochloric acid, all modifications of P. A. D. A. B. instantaneously lose their crystalline form. After a certain period, a fine, amorphous, slightly swollen, powder of violet color is precipitated on the bottom of the vessel, this powder consisting without any doubt of phenyl-azo-diaminobenzene-dihydrochloride. When heated, this dihydrochloride splits off one molecule of hydrochloric acid being transformed into the red modification of the hydrochloride, i. e., into alpha-P. A. D. A. B. Mono-hydrochloride is also obtained if water is added to the mixture with concentrated hydrochloric acid.

In order to transform alpha- or gamma-P. A. D. A. B. or their mixture into the violet beta-P. A. D. A. B., it is necessary first to transform the original hydrochloride into the free base, and then subject it again to the action of weak hydrochloric acid. The decisive factor in the success of the transformation is the concentration of the hydrochloric acid; namely, this concentration determines the nature of the newly formed hydrochloride. Experimentation has shown that in order to obtain beta-P. A. D. A. B. it is necessary that the liquor remaining after the formation of the hydrochloride should contain about 6% of hydrochloric acid.

*Example I—Beta-P. A. D. A. B. violet modification)*

688 grams of gamma-P. A. D. A. B. (the black modification) is thoroughly ground with a mixture of 207 cc. of strong 28%-ammonia and 229 cc. of water. Into the yellowish-brown mass of the free base which is obtained, a mixture of 660 cc. of concentrated hydrochloric acid of specific gravity 1.19 and 1800 cc. of water is added. The hydrochloride which is again formed is filtered off, washed with water until ammonium chloride is fully removed, and then dried on a water bath to a constant weight. As a result, beta-P. A. D. A. B. (the violet modification) is obtained in chemically pure state. Analysis of the filtered mother liquid showed that it contains about 6.7% of HCl.

*Example II—Beta-P. A. D. A. B.*

310 grams of aniline dissolved in a mixture of 1666 cc. of 37%-hydrochloric acid and 3670 cc. of water are diazotized by means of a solution of 233 grams of sodium nitrite in 1000 cc. of water under the control of iodide starch paper. To the resulting mixture, a solution of 360 grams of meta-phenylenediamine in a mixture of 576 cc. of hydrochloric acid of specific gravity 1.19 and 3333 cc. of water, is added. Approximately 40 minutes after the coupling, 1666 cc. of 28%-ammonia is added to the reacting mixture while it is being stirred, after approximately two hours the mixture is again made acid by addition of 1666 cc. of 37%-hydrochloric acid, to which had been previously added an equal quantity of water (1666 cc.). The finely divided crystalline beta-P. A. D. A. B. which is deposited possesses a violet color and strong lustre. It is filtered off by means of vacuum, pressed, and thoroughly washed with three liters of 6.4%-hydrochloric acid (a mixture of 173 cc. of 37%-HCl of specific gravity 1.19, and 827 cc. of water). The yield fluctuates around 755 grams.

In the preceding example the method is described of obtaining beta-P. A. D. A. B. from aniline, hydrochloric acid, and meta-phenylenediamine, with the aid of sodium nitrite and ammonia, in this case the free phenyl-azo-diaminobenzene, although it is precipitated with ammonia as an intermediary product, is not isolated; the entire process is accomplished in only one phase, in the same mother liquor to which new reacting ingredients are repeatedly added. The entire attention of the worker must be directed to an exact calculation of the hydrochloric acid in the final mixture of the reaction. To the original mixture might be added a somewhat greater or lesser amount of ammonia, or the amount of the water contained considerably decreased or increased; but then it is necessary to employ a correspondingly greater or lesser amount of the correspondingly more or less concentrated hydrochloric acid. The mother liquor obtained after the filtration of the final reacting mixture must contain about 6% of HCl.

If, however, the interaction of diazotized aniline with meta-phenylenediamine is performed directly in 6%- or 7%-hydrochloric acid, the coupling does not occur at all; phenyl-azo-2,4-diaminobenzene is not formed in the given pH of the reacting mixture. It is possible, however, to obtain beta-P. A. D. A. B., i. e., the violet hydrochloride of phenyl-azo-2,4-diaminobenzene in a single phase when diazotized aniline is coupled with meta-phenylenediamine, using an exactly calculated amount of alkaline or ammonia salt, soluble in water, of some organic acid, for instance, sodium acetate.

*Example III—Beta-P. A. D. A. B.*

310 grams of aniline dissolved in a mixture of 670 cc. of 37%-HCl and 1340 cc. of water are diazotized by means of a solution of 233 grams of sodium nitrite in 670 cc. of water. Into the resulting solution of benzenediazoniumchloride are introduced 360 grams of meta-phenylenediamine emulsified in a solution of 270 grams of crystalline sodium acetate in 670 cc. of water. After 3 hours the precipitated crystalline mass is filtered off by means of vacuum; thoroughly pressed and washed, while being stirred, with a mixture of 1038 cc. of 37%-hydrochloric acid and 4960 cc. of water in a special vessel. Then the preparation is filtered again and dried on a water bath to a constant weight. Beta-P. A. D. A. B. is obtained in this case in the form of a sandy, crystalline mass possessing strong lustre and a beautiful violet color. The yield fluctuates around 750 grams.

*Example IV—Gamma-P. A. D. A. B.*

310 grams of aniline are dissolved in a mixture of 670 cc. of 37%-hydrochloric acid and 1340 cc. of water. Diazotization is performed by means of a solution of 233 grams of sodium nitrite in 670 cc. of water. When the reaction is terminated, to the resulting mixture is added an emulsion of 360 grams of meta-phenylenediamine in 670 cc. of water, containing also 270 grams of crystalline sodium acetate. (In order to prepare the emulsion, the meta-phenylenediamine is melted by being heated on a water bath in a hermetically sealed vessel, and the resulting liquor is added to the already mentioned solution of sodium acetate while it is being vigorously stirred.)

Two hours later, to the reacting mixture is added 483 cc. of 28%-ammonia, and the mixture is stirred while a small quantity of sodium chloride is being added (10 tablespoonfuls). On the following day, the mother liquor, which has been allowed to precipitate a deposit, is removed by siphoning, while the remaining deposit of free base is subjected to the action of 18 liters of hot water and is sucked off. The operation is repeated twice or even three times. After the last sucking off or centrifuging the deposit is washed once again on the Buechner funnel or the centrifuge, first with hot water and then with cold water, and is thoroughly pressed.

A mixture of 500 cc. of 37%-hydrochloric acid and 1000 cc. of water is poured over the well pressed product. Then it is dried in a thin layer at 75° C. to a constant weight. It is a fine crystalline, anthracite-black mass. The yield is about 620 grams.

I claim as my invention:

1. A medicinal preparation, consisting of a pure modification of phenyl-azo-2,4-diaminobenzene hydrochloride of a group consisting of the violet and red modifications of phenyl-azo-2,4-diaminobenzene hydrochloride and having high bacteriostatic indices.

2. A method of obtaining a pure, violet modification of phenyl-azo-2,4-diaminobenzene hydrochloride, having high bacteriostatic index, said method consisting in coupling diazotized aniline with 2,4-diaminobenzene under condition of almost complete absence of free hydrochloric acid in the reacting medium, precipitating the product with ammonia, filtering, washing with water and weak hydrochloric acid, and drying.

3. A method of obtaining a pure red modification of phenyl-azo-2,4-diaminobenzene hydrochloride, having high bacteriostatic index, said method consisting in treating any modification of phenyl-azo-2,4-diaminobenzene hydrochloride, with concentrated hydrochloric acid, mixing and evaporating the resultant product on water bath.

ALEXANDER T. MAXIMOFF.